(12) United States Patent  
LeGreve et al.

(10) Patent No.: US 8,814,554 B2
(45) Date of Patent: Aug. 26, 2014

(54) ICE CREAM SCOOPS AND METHODS OF MANUFACTURING

(71) Applicant: The Vollrath Company, L.L.C., Sheboygan, WI (US)

(72) Inventors: Mark V. LeGreve, Two Rivers, WI (US); Dake Wang, Sheboygan, WI (US); Michael Hollen, Manitowoc, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 0 days.

(21) Appl. No.: 13/795,292

(22) Filed: Mar. 12, 2013

(65) Prior Publication Data

US 2013/0295216 A1 Nov. 7, 2013

Related U.S. Application Data

(60) Provisional application No. 61/642,178, filed on May 3, 2012, provisional application No. 61/734,212, filed on Dec. 6, 2012.

(51) Int. Cl.
*B28B 1/00* (2006.01)

(52) U.S. Cl.
USPC ............ 425/279; 425/187; 425/221; 425/276

(58) Field of Classification Search
CPC .................................................... A47J 43/282
USPC .................................. 425/187, 221, 279, 276
See application file for complete search history.

(56) References Cited

U.S. PATENT DOCUMENTS

| 841,097 | A | | 1/1907 | Aiken et al. |
| 1,109,576 | A | | 9/1914 | Gilchrist |
| 1,194,685 | A | | 8/1916 | Walker |
| 2,135,503 | A | * | 11/1938 | Guntrip ........................ 206/205 |
| 2,547,651 | A | | 4/1951 | McCrum |
| 2,560,900 | A | * | 7/1951 | Shultz ........................... 425/277 |
| 3,322,075 | A | | 5/1967 | Cronheim |
| 3,421,456 | A | | 1/1969 | Weinstein |
| 3,598,062 | A | | 8/1971 | Weinstein |
| D312,193 | S | | 11/1990 | Cooper |
| 4,981,900 | A | * | 1/1991 | Sugawara ..................... 524/496 |
| 5,000,672 | A | | 3/1991 | Halimi |
| 5,044,914 | A | | 9/1991 | Schulling |
| 5,211,576 | A | * | 5/1993 | Tonkiss et al. ................ 439/462 |
| 5,253,557 | A | | 10/1993 | Dolak |
| D361,480 | S | | 8/1995 | Cooper |

(Continued)

OTHER PUBLICATIONS

Zeroll, Ice Cream Scoop Brochure, dated 2007, 14 pages.

(Continued)

*Primary Examiner* — Timothy Kennedy
*Assistant Examiner* — David N Brown, II
(74) *Attorney, Agent, or Firm* — Foley & Lardner LLP

(57) ABSTRACT

An ice cream scoop includes a head configured to scoop frozen food product, a handle extending from the head to an end, the handle including an internal cavity with the end open to the internal cavity, a heat transfer fluid contained in the internal cavity and in thermal communication with the head, an end cap that closes the end of the handle, a gasket disposed between the end cap and the handle to seal the internal cavity, and a pin that secures the end cap to the handle.

14 Claims, 6 Drawing Sheets

(56) References Cited

U.S. PATENT DOCUMENTS

| | | | |
|---|---|---|---|
| D371,283 S | 7/1996 | Cooper | |
| D391,811 S | 3/1998 | Molo | |
| 5,837,296 A * | 11/1998 | Virkler | 425/277 |
| 6,416,309 B1 * | 7/2002 | Michlitsch et al. | 425/187 |
| 6,568,894 B2 * | 5/2003 | Golden et al. | 411/351 |
| D486,354 S | 2/2004 | Bratton et al. | |
| D487,863 S | 3/2004 | Bitonto et al. | |
| 6,846,171 B2 * | 1/2005 | Herbert | 425/277 |
| D501,373 S | 2/2005 | Allen et al. | |
| D513,946 S | 1/2006 | Lion et al. | |
| D617,155 S | 6/2010 | Frank | |
| D630,063 S | 1/2011 | Funka et al. | |
| 2003/0198706 A1 * | 10/2003 | Kim | 425/187 |

OTHER PUBLICATIONS

Restriction Requirement for U.S. Appl. No. 29/449,277, dated Jan. 13, 2014, 6 pages.

\* cited by examiner

ICE CREAM SCOOPS AND METHODS OF MANUFACTURING

CROSS-REFERENCE TO RELATED PATENT APPLICATIONS

This application claims the benefit of U.S. Provisional Application No. 61/734,212, filed Dec. 6, 2012, which is incorporated herein by reference in its entirety. This application also claims the benefit of U.S. Provisional Application No. 61/642,178, filed May 3, 2012, which is incorporated herein by reference in its entirety.

BACKGROUND

The present invention relates generally to the field of food utensils. In particular, the present relation relates to ice cream scoops used to scoop and serve frozen or semi-frozen food product.

SUMMARY

One embodiment of the invention relates to an ice cream scoop including a head configured to scoop frozen food product, a handle extending from the head to an end, the handle including an internal cavity with the end open to the internal cavity, a heat transfer fluid contained in the internal cavity and in thermal communication with the head, an end cap that closes the end of the handle, a gasket disposed between the end cap and the handle to seal the internal cavity, and a pin that secures the end cap to the handle.

Another embodiment of the invention relates to a method for manufacturing an ice cream scoop including providing a handle extending from a head to an open end, the head configured to scoop frozen food product and the handle including an internal cavity, filling the internal cavity with a heat transfer fluid, inserting a portion of the end cap into the handle to close the end of the handle, sealing the internal cavity with a gasket positioned between the handle and the end cap, and securing the end cap to the handle by inserting a pin into the handle and the end cap.

Another embodiment of the invention relates to a utensil including a metal head configured to serve frozen food product, a metal handle extending from the head to an end, the handle including an internal cavity with the end open to the internal cavity, a heat transfer fluid contained in the internal cavity, a plastic end cap that closes the end of the handle, an elastomer gasket disposed between the end cap and the handle to seal the internal cavity, and a metal pin that secures the end cap to the handle.

DETAILED DESCRIPTION

Figure 1:
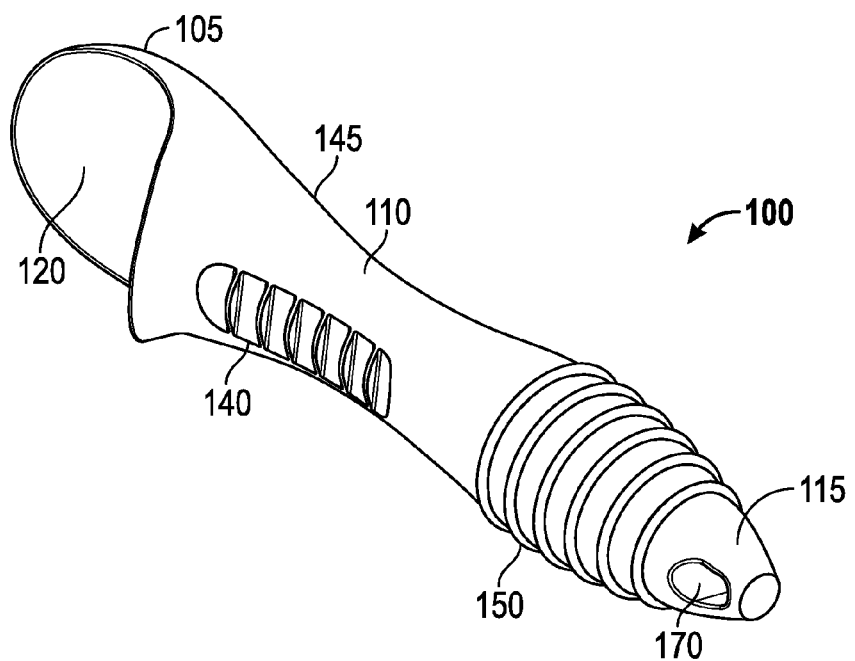
FIG. 1 is a perspective view of an ice cream scoop according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-8, a utensil shown as an ice cream scoop 100 is illustrated. The ice cream scoop 100 includes a head 105, a handle 110, and an end cap 115. The ice cream scoop 100 is preferably constructed from aluminum. Alternatively, the ice cream scoop 100 may be made from a variety of materials, including other metals, plastics, or the like. The components of the ice cream scoop 100 are non-toxic and safe for use in food service.

The head 105 includes a face or concave surface 120 that is configured to scoop a frozen food product (e.g., ice cream, frozen yogurt, sherbet, sorbet, gelato, etc.). The head 105 can be of various sizes with each size configured to scoop a different amount of ice cream. The amount of ice cream can be measured by volume or weight. The head 105 is positioned at one end of the handle 110. Alternatively, the head 105 can form a spade, paddle, or other shape suitable for serving or dispensing a frozen food product.

The handle 110 extends from the head 105 to an end 125 opposite the handle 110. The end 125 is open and leads to an internal cavity 130 formed inside the handle 110. The internal cavity 130 extends for substantially the entire length of the handle 110 from the head 105 to the end 125. A handle mating or coupling section 135 is located adjacent the end 125 of the handle 110. The coupling section 135 facilitates mating or coupling the end cap 115 to the handle 110.

The internal cavity 130 (shown in FIGS. 5 and 8) is filled with a heat transfer fluid. The heat transfer fluid can be antifreeze, a refrigerant, air, or other fluid suitable for transferring heat. For example, propylene glycol can be used as the heat transfer fluid. IceClear®AF Non-Glycol Anti-Freeze sold by Orison Marketing, L.L.C. of Abilene, Tex. can also be used as the heat transfer fluid. In use, the heat transfer fluid in the internal cavity 130 transfers heat from the user's hand gripping the handle 110 to the head 105 to warm the head 105. The heat transfer fluid is in thermal communication with the head 105 (e.g., conductive thermal communication) to keep the head 105 defrosted and reduces the need for the user to rinse or otherwise manually defrost the head 105. Defrosting and increasing the relative temperature of the head 105 also allows the head 105 to more easily cut into the ice cream when scooping ice cream with the ice cream scoop 100.

A thumb grip portion 140 is formed on the handle 110 near the head 105. A finger grip portion 145 is formed on the handle 110 opposite the thumb grip portion 140. A hand grip portion 150 is formed near the end 125 of the handle 110. The hand grip portion 150 extends around the circumference of the handle 110. The grip portions 140, 145, and 150 are knurled, ribbed, ridged, roughened, or otherwise textured to improve the user's grip on the handle 110.

Figure 2:
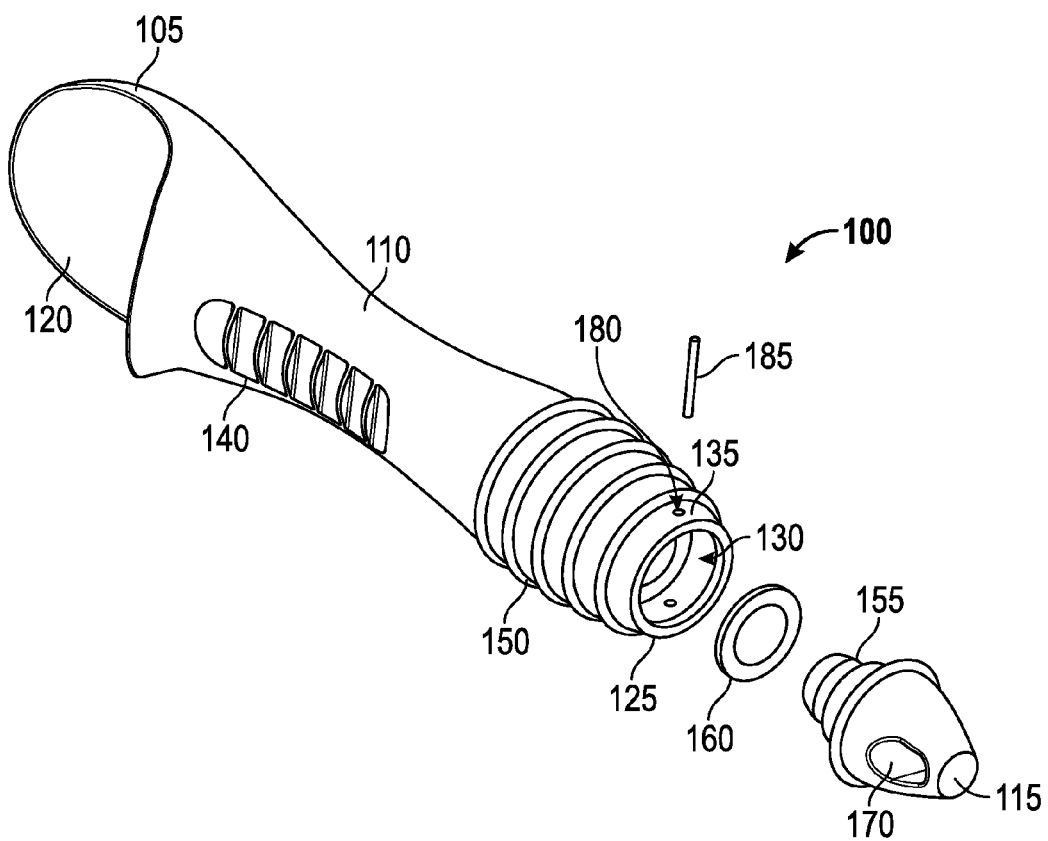
FIG. 2 is an exploded perspective view of the ice cream scoop of FIG. 1.
Figure 3:
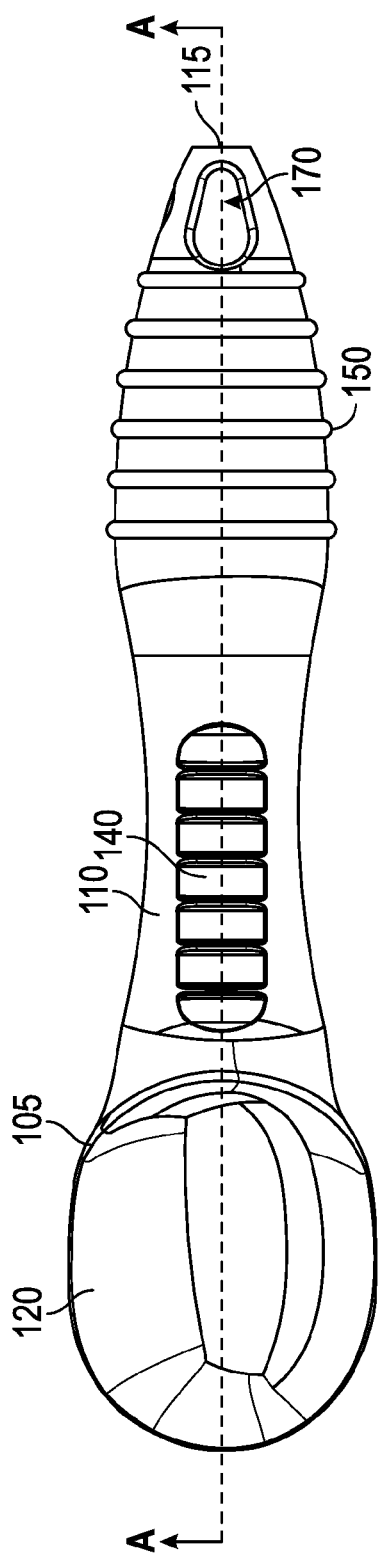
FIG. 3 is a top view of the ice cream scoop of FIG. 1.
Figure 4:
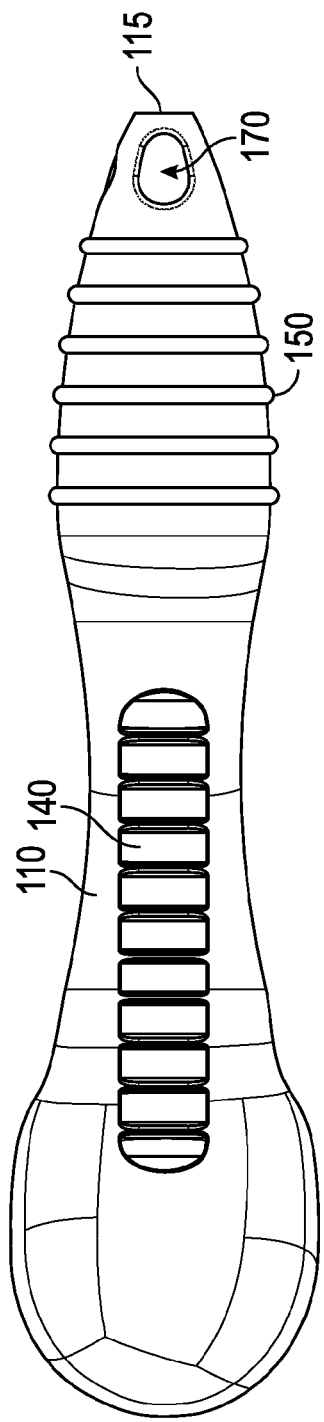
FIG. 4 is a bottom view of the ice cream scoop of FIG. 1.
Figure 5:
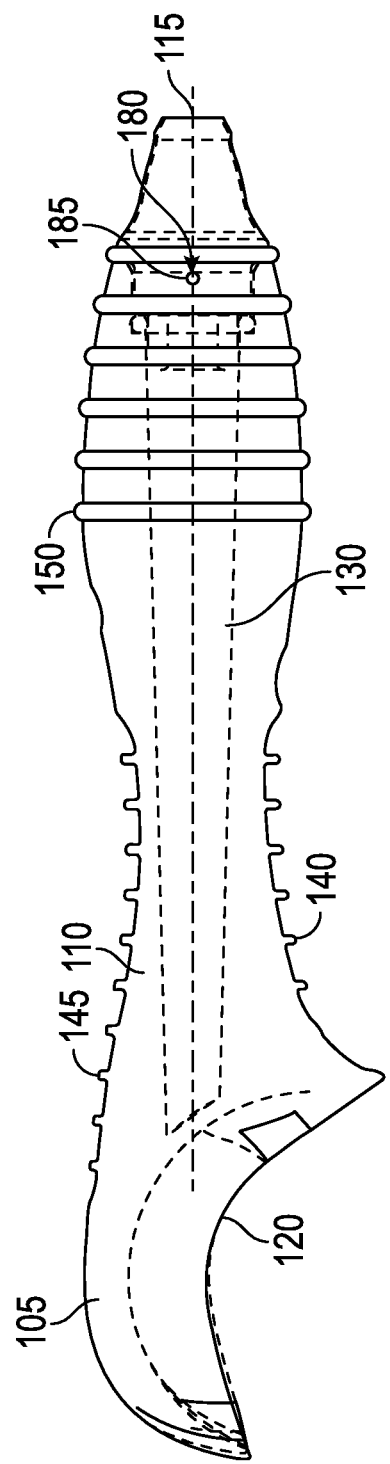
FIG. 5 is a side view of the ice cream scoop of FIG. 1.
Figure 6:
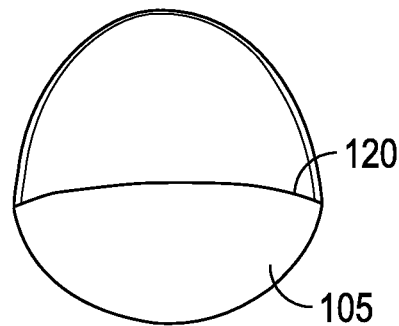
FIG. 6 is a front view of the ice cream scoop of FIG. 1.
Figure 7:
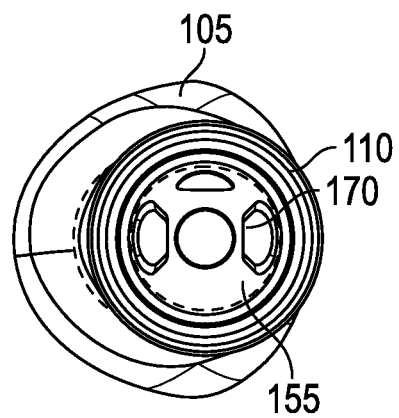
FIG. 7 is a rear view of the ice cream scoop of FIG. 1.
Figure 8:
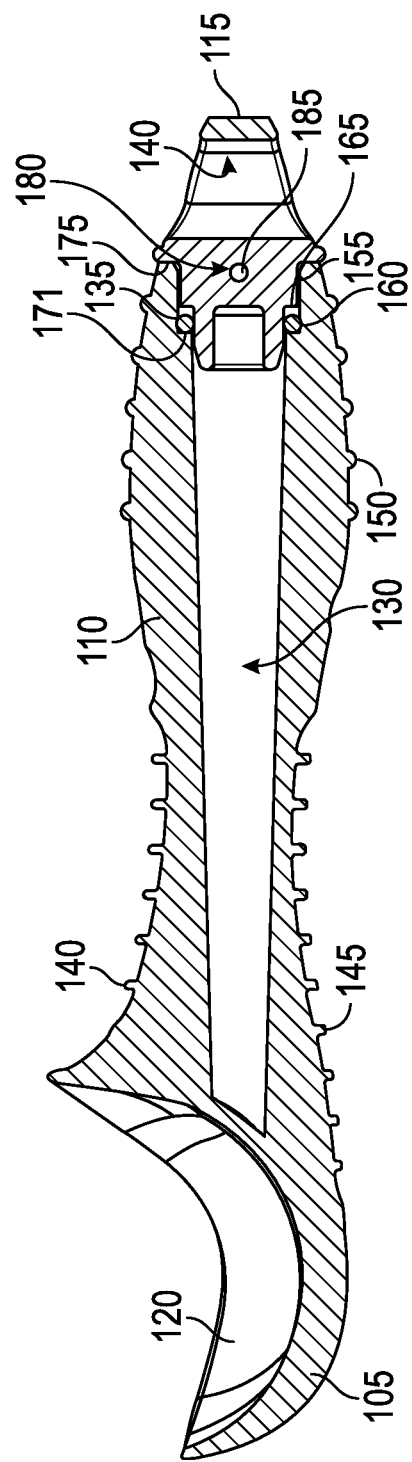
FIG. 8 is a sectional view of the ice cream scoop of FIG. 1.
Figure 9:
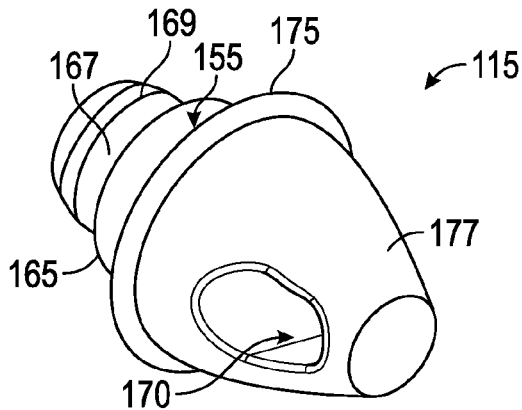
FIG. 9 is a perspective view of an end cap of the ice cream scoop of FIG. 1 according to an exemplary embodiment.
Figure 10:
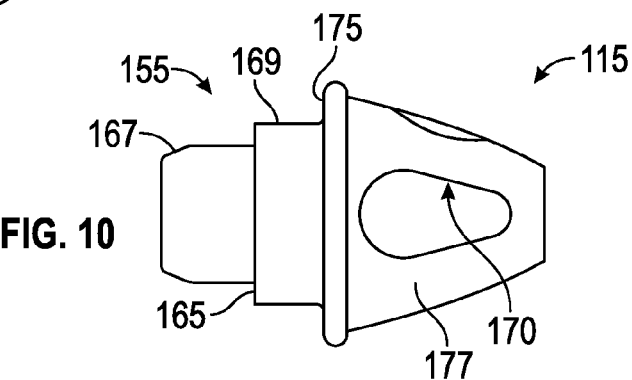
FIG. 10 is a side view of the end cap of FIG. 9.
Figure 11:
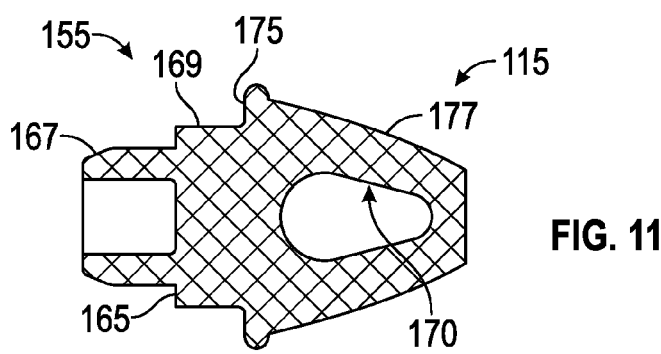
FIG. 11 is a sectional view of the end cap of FIG. 9.
Figure 12:
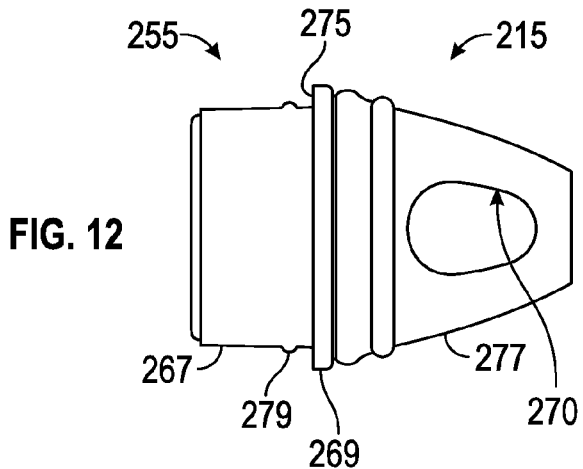
FIG. 12 is a side view of an end cap according to an exemplary embodiment.

As shown in FIGS. 9-11, the end cap 115 includes a cap coupling section 155. The coupling section 155 engages the coupling section 135 of the handle 110 to couple the end cap 115 to the handle 110. As shown in FIGS. 2 and 8, an o-ring or gasket 160 is positioned between the handle 110 and the end cap 115 to form a seal therebetween and prevent the heat transfer fluid from escaping the internal cavity 130. The gasket 160 may be made of rubber or an elastomer (e.g., a synthetic rubber, such as EPDM rubber). As shown in FIGS. 8-11, a groove or shoulder 165 is formed in the end cap 115. The gasket 160 surrounds an inner portion 167 of the cap coupling section 155 and is positioned against the shoulder 165. The inner portion 167 has a smaller diameter than an outer portion 169 of the cap coupling section 155. As shown in FIG. 8, a corresponding shoulder 171 is formed in the handle coupling section 135 so that the gasket 160 is positioned between the shoulder 165 of the end cap 115 and the shoulder 171 of the handle 110 when the cap coupling section 155 is inserted into the handle 110. The end cap 115 also includes a through-hole 170. The through-hole 170 is sized and shaped to receive a hook or other device suitable for the ice cream scoop 100 to hang from when not in use. As shown in FIG. 3, in some embodiments, the through-hole 170 is aligned with the face 120 of the head 105. A shoulder or stop 175 formed in the end cap 115 contacts the end 125 of the handle 110 to limit the insertion of the end cap 115 into the handle 110. The stop 175 positions the coupling section 155 in the internal cavity 130 and an exterior section 177 of the end cap 115 outside of the internal cavity 130. The through-hole 170 is formed through the exterior section 177. In some embodiments, the end cap 115 is colored. Heads 105 of different sizes (e.g., for producing scoops of different sizes) are color-coded with end caps 115 of different colors so that the color of the end cap 115 identifies the size of the head 105. In some embodiments, the end cap 115 is made from plastic (e.g., polypropylene, nylon, etc.).

The end cap 115 may be secured to the handle 110 with one or more securing techniques. In some embodiments, the end cap 115 is pinned to the handle 110. As shown in FIG. 8, the open end 125 of the handle 110 is closed by inserting at least a portion of the end cap 115 (e.g., the coupling section 155) into the internal cavity 130 of the handle 110. The end cap 115 is secured to the handle 110 by forming (e.g., by drilling) a hole 180 that extends through the handle 110 into the end cap 115 and inserting a dowel or pin 185 into the hole 180. In some embodiments, after inserting the pin 185 into the hole 180, the pin 185 is trimmed (e.g., cut, ground, etc.) so that the end of the pin 185 is flush with the outer surface of the handle 110. In some embodiments, the pin 185 is made from aluminum (e.g., food-grade aluminum). Alternatively, the pin 185 may be made from a variety of materials, including other metals, plastics, or the like.

As described above, the hole 180 is formed after the end cap 115 is inserted into the handle 110. Alternatively, a first portion of the hole 180 is formed in the handle 110 and a second portion of the hole 180 is formed in the end cap 115 prior to inserting the end cap 115 into the handle 110. In some embodiments, the hole 180 extends partway into the end cap 115. In other embodiments, the hole 180 extends from a first side of the handle 110, through the entirety of the end cap 115, and into a second opposite side of the handle 110. In some embodiments, the coupling section 135 of the handle 110 and the coupling section 155 of the end cap 115 are tapered (e.g., get narrower in the direction from the end 125 to the head 105 of the handle 110). This tapering may help to facilitate press-fitting the end cap 115 into the handle 110.

In some embodiments, the end cap 115 is press fit into the handle 110 to secure the end cap 115 to the handle 110. In some embodiments, the end cap 115 and the handle 110 are threaded so that the end cap 115 is threadedly secured to the handle. In some embodiments, the end cap 115 and the handle 110 are deformed (e.g., crimped) to secure the end cap 115 to the handle 110. The handle 110 and end cap 115 may deformed from a substantially circular shapes to a narrower oval or egg shapes. Deforming the end cap 115 and handle 110 may also seal the internal cavity 130 so that the gasket 160 may be omitted.

Two or more of these techniques may be combined to secure the end cap 115 to the handle 110. In some embodiments, the end cap 115 may be threaded into the handle 110 and then be deformed, including deforming the threads, to further secure the end cap 115 to the handle 110. In other embodiments, the end cap 115 may be press fit into the handle 110 and then have the end cap 115 and the handle 110 deformed to further secure the end cap 115 to the handle 110. In other embodiments, the end cap 115 may be press fit in to the handle 110 and then pinned to the handle 110. In other embodiments, the end cap 115 by threaded into the handle 110 and then pinned to the handle 110.

FIG. 11 illustrates an end cap 215 according to an alternative embodiment. The end cap 215 is similar to the end cap 115 and similar components are described with reference numerals in the 200s rather than the 100s. The end cap 215 includes a cap coupling section 255 and an exterior section 277. A stop 275 separates the cap coupling section 255 from the exterior section 277. The cap coupling section 255 includes a protrusion 279 that separates an inner portion 267 from an outer portion 269. A gasket (e.g., gasket 160) may be positioned on the inner portion 267 to form a seal between the cap coupling section 255 and a handle of a utensil (e.g., handle 110 of utensil 100). A through-hole 270 is formed through the exterior section 277.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:
1. An ice cream scoop comprising:
a head configured to scoop frozen food product;
a handle extending from the head to an end, the handle including an internal cavity with the end open to the internal cavity;
a heat transfer fluid contained in the internal cavity and in thermal communication with the head;

an end cap that closes the end of the handle, wherein the end cap includes a cap coupling section, an exterior section, and a shoulder between the cap coupling section and the exterior section, and wherein the cap coupling section is positioned within the internal cavity and the shoulder is positioned against the end of the handle, and wherein the cap coupling section includes an inner portion with a first diameter, an outer portion with a second diameter greater than the outer portion, and a second shoulder between the inner portion and the outer portion;

a gasket disposed between the end cap and the handle to seal the internal cavity, wherein the gasket is positioned around the inner portion of the cap coupling section; and a pin that secures the end cap to the handle.

2. The ice cream scoop of claim 1, wherein the handle further includes a third shoulder, and wherein the gasket is positioned between the second shoulder and the third shoulder.

3. The ice cream scoop of claim 1, wherein the pin extends into the coupling section of the end cap.

4. The ice cream scoop of claim 1, wherein the pin extends through the coupling section of the end cap.

5. The ice cream scoop of claim 1, further comprising:
a hole formed in the handle and the coupling section of the end cap, wherein the pin is positioned in the hole.

6. The ice cream scoop of claim 1, wherein the coupling section of the end cap is press fit to the handle.

7. The ice cream scoop of claim 1, wherein the coupling section of the end cap includes external threads and a coupling section of the handle includes internal threads so that the end cap is threadedly secured to the handle.

8. The ice cream scoop of claim 1, wherein the end cap is color-coded to the size of the head.

9. The ice cream scoop of claim 1, wherein the head, the handle, and the pin are aluminum.

10. The ice cream scoop of claim 1, wherein the end cap is polypropylene.

11. The ice cream scoop of claim 1, wherein the gasket is EPDM rubber.

12. The ice cream scoop of claim 1, wherein the head, the handle, and the pin are metal.

13. The ice cream scoop of claim 1, wherein the end cap is plastic.

14. The ice cream scoop of claim 1, wherein the gasket is an elastomer.

* * * * *